United States Patent [19]
McComber et al.

[11] Patent Number: 6,032,320
[45] Date of Patent: Mar. 7, 2000

[54] TROWEL HAVING IMPOSED BLADE STRESSES AND METHOD OF MANUFACTURE

[75] Inventors: Larry J. McComber, Marshalltown, Iowa; Jack D. Murders, Fayetteville, Ak.

[73] Assignee: Marshalltown Trowel Company, Mashalltown, Iowa

[21] Appl. No.: 09/052,700

[22] Filed: Mar. 31, 1998

Related U.S. Application Data

[60] Continuation-in-part of application No. 08/727,871, Sep. 11, 1996, Pat. No. 5,791,009, which is a division of application No. 08/377,323, Jan. 23, 1995, Pat. No. 5,697,265.

[51] Int. Cl.[7] .................................................. B05C 17/10
[52] U.S. Cl. .......................................... 15/235.4; 76/119
[58] Field of Search .............................. 15/235.4, 235.8; 72/53, 379.2; 76/119

[56] References Cited

U.S. PATENT DOCUMENTS

| | | |
|---|---|---|
| 162,355 | 4/1875 | Disston . |
| 2,491,677 | 12/1949 | McCulloch . |
| 2,626,520 | 1/1953 | Whalen . |
| 2,680,938 | 6/1954 | Peterson . |
| 2,907,151 | 10/1959 | Peterson . |
| 3,000,425 | 9/1961 | Hodges et al. . |
| 3,073,022 | 1/1963 | Bush et al. . |
| 3,094,768 | 6/1963 | Croft . |
| 3,205,556 | 9/1965 | Romans . |
| 3,482,423 | 12/1969 | Murray et al. . |
| 3,827,270 | 8/1974 | Neilsen . |
| 4,167,864 | 9/1979 | Taipale . |
| 4,258,084 | 3/1981 | Hayden, Sr. . |
| 4,604,881 | 8/1986 | Lienert . |
| 4,766,635 | 8/1988 | De Vitis . |
| 4,884,312 | 12/1989 | Clark . |
| 4,974,434 | 12/1990 | Reccius et al. . |
| 5,067,889 | 11/1991 | Humiston . |
| 5,193,244 | 3/1993 | Meyers . |
| 5,440,776 | 8/1995 | Kartler . |
| 5,697,265 | 12/1997 | McComber et al. . |

FOREIGN PATENT DOCUMENTS

| | | |
|---|---|---|
| 2202627 | 7/1973 | Germany . |
| 270 435 A3 | 2/1989 | Germany . |
| 1643133 | 4/1991 | U.S.S.R. . |
| 1705051 | 1/1992 | U.S.S.R. . |
| 908937 | 10/1962 | United Kingdom . |
| 1348191 | 3/1974 | United Kingdom . |

OTHER PUBLICATIONS

"Metals Handbook," $8^{th}$ edition, vol. 2, Heat Treating, Cleaning, and Finishing, pp. 398–402 eds. Lyman American Society for Metals.

*Primary Examiner*—Randall E. Chin
*Attorney, Agent, or Firm*—McAndrews, Held & Malloy, Ltd.

[57] ABSTRACT

A trowel and related method of manufacture in which residual stresses are intentionally imposed upon the bottom working surface and/or the top mounting surface of a trowel blade. Stresses can be imposed, for example, by glass bead peening, shot peening, rolling, and/or brushing the metal trowel blade. Stresses are built up to a working stress level that remains substantially constant with further use of the trowel against abrasive, spreadable surfaces. Imposed stresses on the top and bottom surfaces can also be used to vary the resulting curvature of the blade.

9 Claims, 9 Drawing Sheets

AXIAL STRESS PROFILES

TRANSVERSE STRESS PROFILES

TRANSVERSE STRESS PROFILES

TROWEL HAVING IMPOSED BLADE STRESSES AND METHOD OF MANUFACTURE

RELATED APPLICATIONS

This is a continuation-in-part of prior application Ser. No. 08/727,871, filed on Sep. 11, 1996, which issued as U.S. Pat. No. 5,791,009, on Aug. 11, 1998 which is a divisional of prior application Ser. No. 08/377,323, filed on Jan. 23, 1995, which issued as U.S. Pat. No. 5,697,265, on Jan. 16, 1997.

BACKGROUND OF THE INVENTION

The invention relates to trowels for spreading concrete, plaster and other types of spreadable materials, and more particularly relates to the intentional manipulation of stresses in the blade of a trowel during its manufacture.

Spreadable materials such as concrete, plaster, and adhesives are smoothed to achieve a desired surface finish or profile. Such smoothing is done by hand tools that have a flat surface that is drawn across the spreadable material. Such tools include trowels which are typically used to apply the spreadable material as well as to finish the surface.

Trowels constructed with a thin flexible blade are generally preferred for both application and smoothing of the spreadable material. In some applications, the worker desires that his trowel blade be perfectly flat. In other applications, it is desired that the blade be slightly bowed, curving or bending upwardly both in its length and width direction.

Warpage or excessive bowing of the blade is a common problem. The blade of a new trowel, for example, may become warped or bowed during its initial use; even though the trowel blade is made from material having a very high yield strength, it can warp or bow excessively after a few hours' use. Skilled workers will return tools to the manufacturer if their blades warp or bow excessively.

Tool manufacturers purchase flat strip material from which they manufacture trowel blades. The same material is purchased repeatedly over time from the same supplier, but does not necessarily produce consistent trowel blades that have the same warpage or bow after use.

Even though trowels and other tools for applying and smoothing spreadable materials are relatively simple and have been used for many years, warpage and bowing of trowel blades have remained unresolved problems in the art.

Concrete finishing trowels are generally unacceptable to the user during when they are brand new. The user must go through a break-in period during which the trowel exhibits undesirable characteristics. New trowels, which have substantially flat working surfaces, typically pop aggregate, leave ripple marks, lines in the concrete, as well as dig marks from the corners of the trowel. Experienced users appreciate that a new trowel typically requires an extensive break-in period before the trowel will behave properly in the field. Over time and with help from the user in the form of judicious bending, the trowel eventually attains desirable "broken-in" characteristics. Notably, the corners of the trowel gradually become "turned-up" giving the working surface of the trowel a convex shape. In addition, material becomes worn from the axial edges of the trowel, causing them to become beveled.

SUMMARY OF THE INVENTION

It is an object of the present invention to overcome the disadvantages of tools used to apply and finish spreadable materials containing abrasive particles.

It is a specific object of the present invention to provide a tool for applying and finishing spreadable materials having a blade that will not warp or bow excessively as a result of use.

It is another object of the present invention to provide a tool for applying and finishing spreadable material which requires no break-in period, has the correct blade working surface shape as manufactured and retains that shape throughout the useful life of the tool.

It is another object of the present invention to provide a blade for a tool for spreading and finishing a spreadable material that will not warp as a result of use with materials containing abrasive particles.

Another object of the present invention is to provide a blade for a tool for spreading and finishing a spreadable material having a working surface that is intentionally stressed during manufacture to the typical residual stress that will be created on the working surface during use with materials containing abrasive particles.

It is a further object of the present invention to provide a method of manufacturing trowel blades.

Yet another object of the present invention is to provide a method of manufacturing a blade for a tool for applying and finishing a spreadable material that will not warp as a result of use with materials containing abrasive particles.

More particularly, a method of manufacturing a blade for a tool for applying and spreading spreadable material is provided with the blade having a residual stress intentionally imposed on the working surface of the blade. This imposed stress is related to the stress that will be imposed on the blade by the intended spreadable material during use.

In one embodiment, a complimentary stress is imposed on the back surface of the blade in order to compensate or control any deformation of the blade due to stress on the working side of the blade. Such a complimentary stress may be used to cause the blade to retain its manufactured shape.

DETAILED DESCRIPTION OF THE PREFERRED EMBODIMENT

Figure 1:
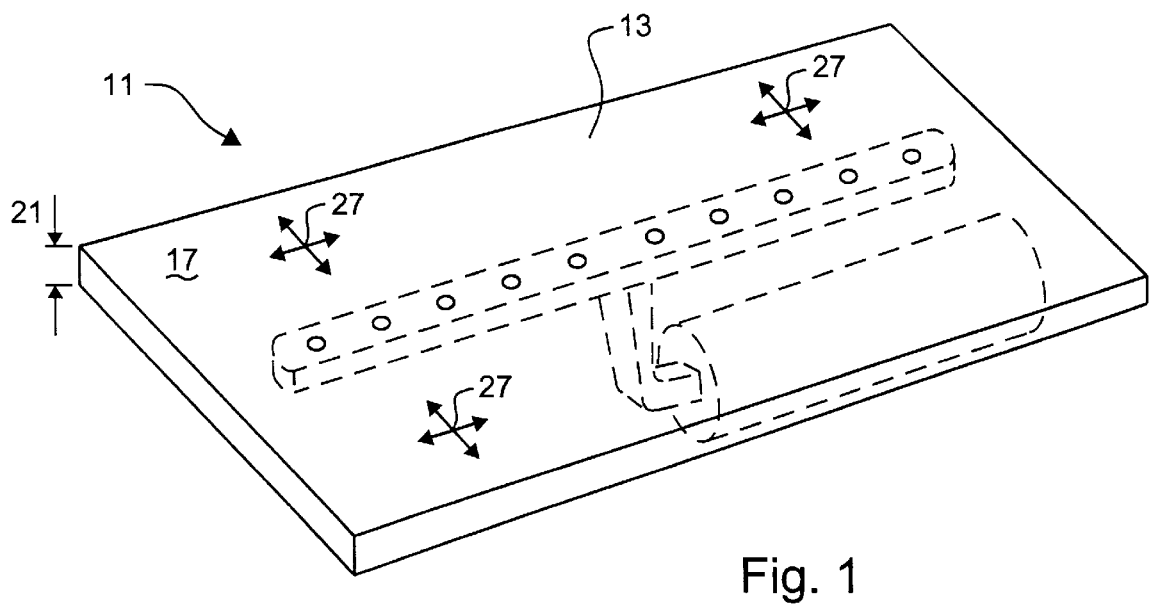
FIG. 1 is a bottom perspective view of a finishing trowel manufactured according to the present invention.
Figure 2:
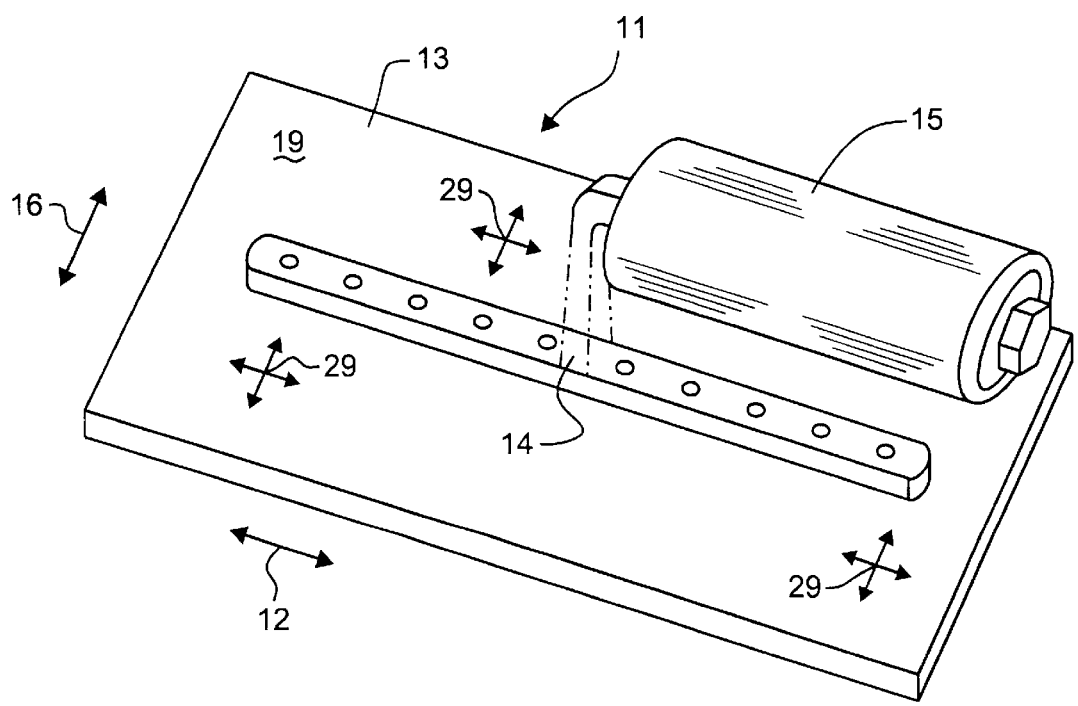
FIG. 2 is a top perspective view of the trowel of FIG. 1.

Referring to FIGS. 1 and 2, a cement trowel 11 is formed of a metal (steel, stainless steel, Monel, etc.) blade 13, a mounting 14 and a handle 15. Blade 13 is formed of a rectangular sheet of metal having a bottom surface 17 and a top surface 19. Surfaces 17, 19 lie in parallel planes separated a distance 21 of the thickness of blade 13. Blade 13 has an axial direction 12 which runs parallel to mounting 14, and a transverse direction 16 which runs perpendicular to mounting 14.

Figure 3:
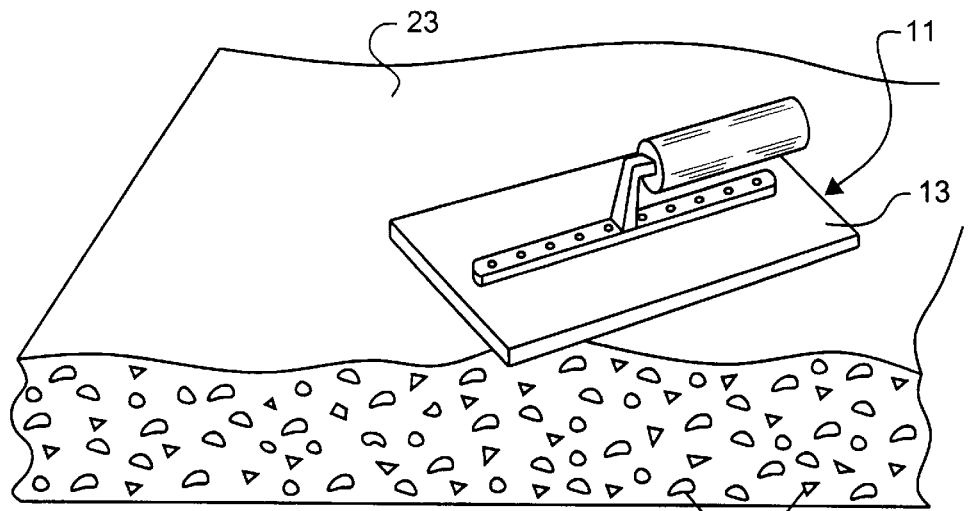
FIG. 3 is a perspective view illustrating the working of the trowel of FIG. 1 in a spreadable material.

As shown in FIG. 3, trowel 11 is used by a skilled worker (not shown) to apply and/or spread a spreadable material such as concrete 23. Concrete 23 includes abrasive particles such as sand, rocks or gravel 25. As blade 13 is moved across the concrete, the cement and abrasive particles impact against the bottom surface 17 of the blade. This has been found to produce a very high bi-axial or trans-axial stress on the flat surface 17 of the blade. That is, the bottom surface of the trowel is stressed in all directions along the flat surface 17. This stress appears to be a result of "lapping" or abrasion of the blade surface against the abrasive particles 25 in the material 23 being spread. The act of troweling creates high (up to 130,000 psi) shallow, (up to 0.0015" deep) bi-axial or trans-axial, compressive, residual stresses in the bottom working surface of the blade. The resulting stress is the cumulative effect of the plastic deformation of micro-regions of the metal by contact between the blade surface and individual particles.

As a new trowel is used, its bottom blade surface becomes stressed through use against concrete or other abrasive particle containing materials. This is often called "breaking-in" of a new trowel. Regardless of the initial residual stress state of the working surface of a conventional trowel, troweling of abrasive materials quickly develops a high, shallow, bi-axial or trans-axial, compressive stress. Such stress development is apparent in the first several hours of use. With further use, stress continues to develop up to a limiting value. The development rate slows as the limit is approached and generally stops after the limit is reached. This limit is approximately sixty percent of the blade material's yield strength.

The stress developed at the bottom surface of the blade remains constant thereafter with use. As the trowel is used, the bottom surface is abraded removing material from the metal blade, but, at the same time, the abrasion will stress the newly presented blade material at the surface. The surface stress in a "broken-in" trowel is, therefore, constant and predictable.

This stress buildup on the bottom working surface occurs when the trowel works with all commonly troweled materials which contain abrasive particles. Such materials include concrete, mortar, plaster, drywall compound and proprietary plaster-like materials containing hard particles in a synthetic carrier and which transform to a hard, plaster-like material upon curing or drying.

Referring again to FIG. 1, blade 13 is provided with a flat working surface 17. A certain shallow level of stress, represented by arrows 27, is intentionally imposed on the working surface of the blade. That level of stress 27 is made substantially equal to the level and depth of stress that the intended spreadable material would impose on working surface 17 during use of trowel 11 with the intended spreadable material.

As shown in FIG. 2, a compensating stress 29 is imposed on top surface 19 of blade 13. The compensating stress 29 compensates for the tendency of blade 13 to bow or distort in shape due to the stress level 27 imposed on the working surface 17 of the blade.

Figure 4:
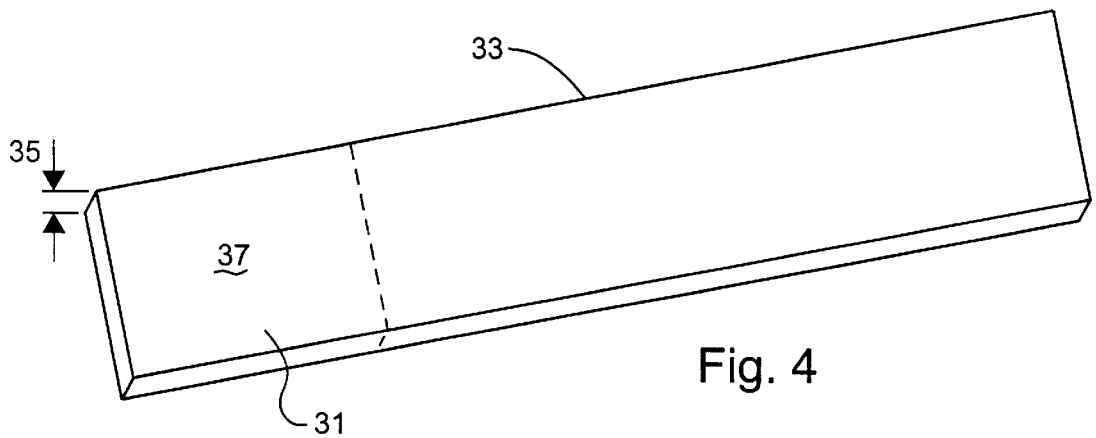
FIG. 4 is a perspective view of a sheet of metal from which the trowel of FIG. 1 is manufactured.

Referring to FIG. 4, blade 13 is manufactured by cutting a blade cell 31 from a flat strip of steel 33 having a thickness 35. Strip 33 is unrolled from a coil and has a width equal to the width of blade 13. Blade cell 31 is cut in a rectangular shape and carries a flat surface 37. Blade cell 31 may be cut by using conventional steel cutting blades or cutting torches, as will suggest itself. Ends of the blade cell 31 can be cut square, round, or at some angle other than 90 degrees.

Flat surface 37 carries a particular residual stress depending on the manner in which the flat strip of steel 33 was formed and finished by its manufacturer. Importantly, the bottom surface 37 is intentionally stressed to a particular stress level. During this intentional stressing step, the surface 37 may be worn by abrasion, for example, which abrasion itself will impose a stress level to the surface 37.

Figure 5:
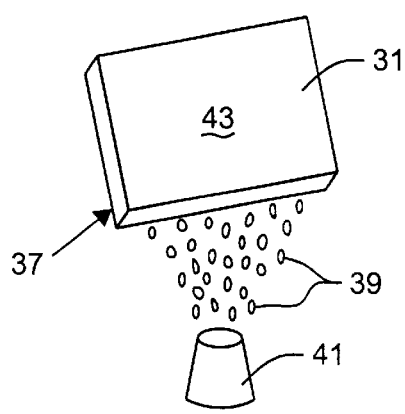
FIG. 5 is a perspective view of a step in the manufacturing process of the trowel of FIG. 1.
Figure 6:
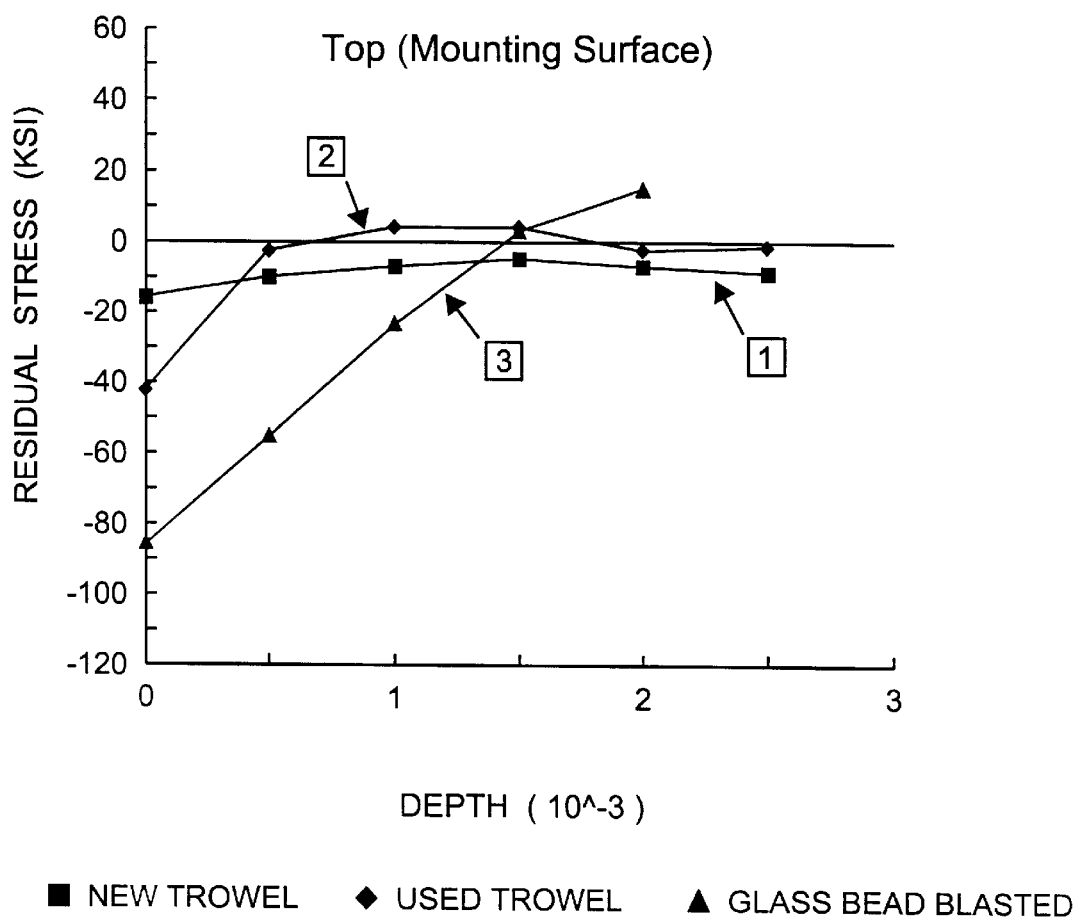
FIG. 6 is a graph showing axial stress profiles on the top (mounting) blade surface for new, used, and glass bead blasted trowels, with tensile stress shown as positive (+) and compressive stress shown as negative (−). The vertical axis shows residual stress measured in KSI (kips per square inch) and the horizontal axis shows depth in thousandths (0.001) of an inch.

As shown in FIG. 5, the flat surface 37 of blade cell 31 is uniformly blasted by individual glass beads 39 of selected sizes. The beads 39 are forced against the blade cell 31 for a predetermined length of time. Blade cell 31 may be moved with respect to a single blasting nozzle 41 from which the beads are shot. Alternatively, cell 31 may be held fixed and a plurality of like nozzles 41 may be used to shoot beads against the surface 37. The blasting is performed so that surface 37 should be stressed uniformly.

After the bottom surface 37 has been uniformly stressed, the top surface 43 of blade cell 31 is also uniformly stressed. The blade cell 31 may be inverted and the same blasting nozzles 41 may be used. Alternatively, nozzles 41 may be located on both sides of blade cell 31 and surfaces 37, 43 are blasted simultaneously. The time during which the two surfaces 37, 43 are subject to blasting may be of the same length. The times and intensity of blasting are predetermined so that subsequent trowels of substantially the same characteristics may be manufactured. Other conditions during the blasting may include, for example, an environment of ambient air and at ambient temperature levels.

In the preferred embodiment, troweling such materials as concrete, plaster, drywall compound, and/or Exterior Insulation Finishing Systems (EIFS) has been found to produce known residual stress profiles in untreated trowel blades. As shown in FIGS. 6–9, axial and transverse residual stress profiles for new (graphical plot 1), used (graphical plot 2), and glass bead blasted (graphical plot 3) trowel blades are plotted. This numerical data was obtained using X-Ray diffraction measurement devices. Sub-surface values were obtained by removing layers via chemical electropolishing and then repeatedly measuring the newly exposed surface. All sub-surface values were corrected for the effect of removed layers. The data plots for the new, used, and blasted trowel blades represent thousands of residual stress measurements.

As shown in FIGS. 6–9, the residual axial and transverse stresses, particularly on the bottom working surface 17 (FIG. 1), change substantially after use (compare graphical plots 1 and 2). Such troweling causes the overall residual stress to "build" on the working surface within a few hours to a working stress level. Hence, steels and other materials used for trowel blades have a natural residual stress limit, or capacity, when subjected to normal troweling uses.

Figure 7:
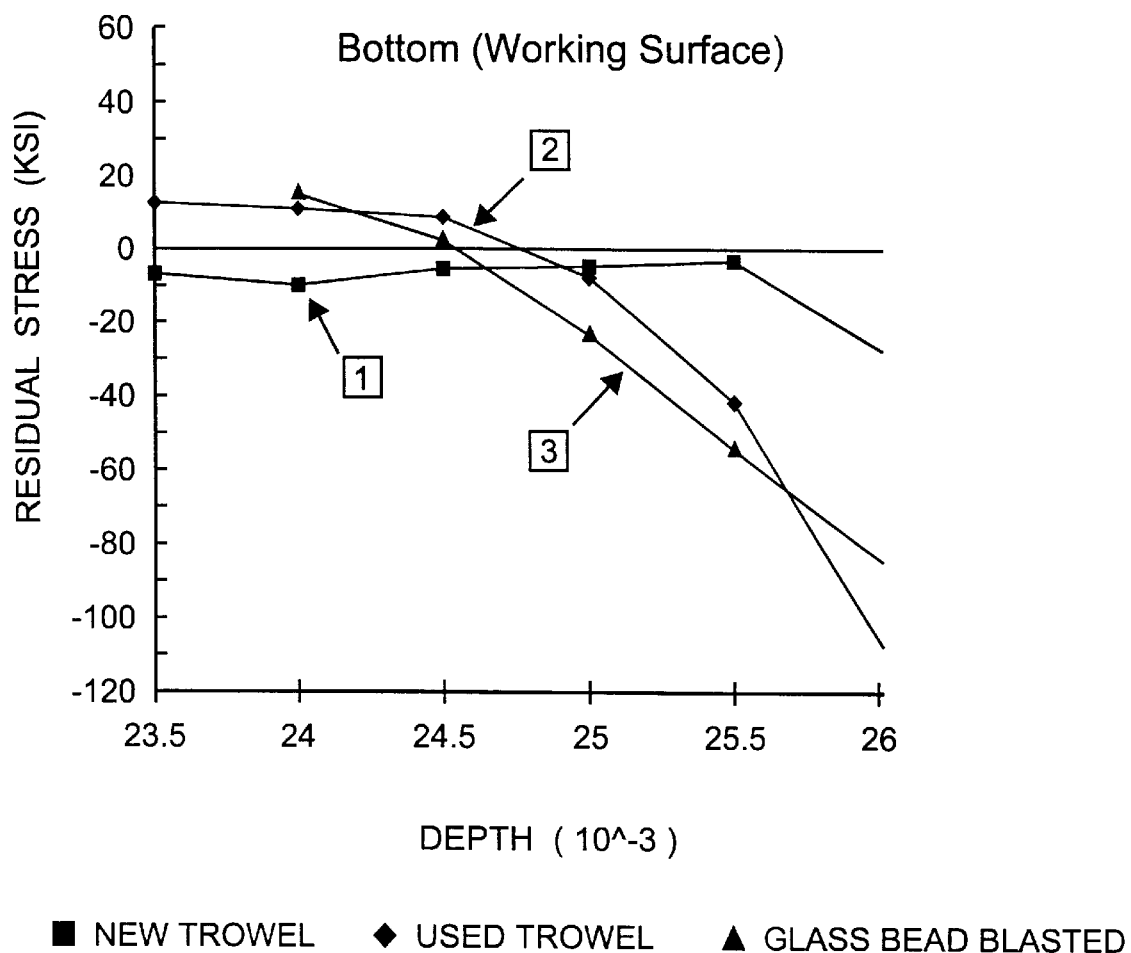
FIG. 7 is a graph showing axial stress profiles on the bottom (working) blade surface for new, used, and glass bead blasted trowels, with tensile stress shown as positive (+) and compressive stress shown as negative (−). The vertical axis shows residual stress measured in KSI (kips per square inch) and the horizontal axis shows depth in thousandths (0.001) of an inch.
Figure 8:
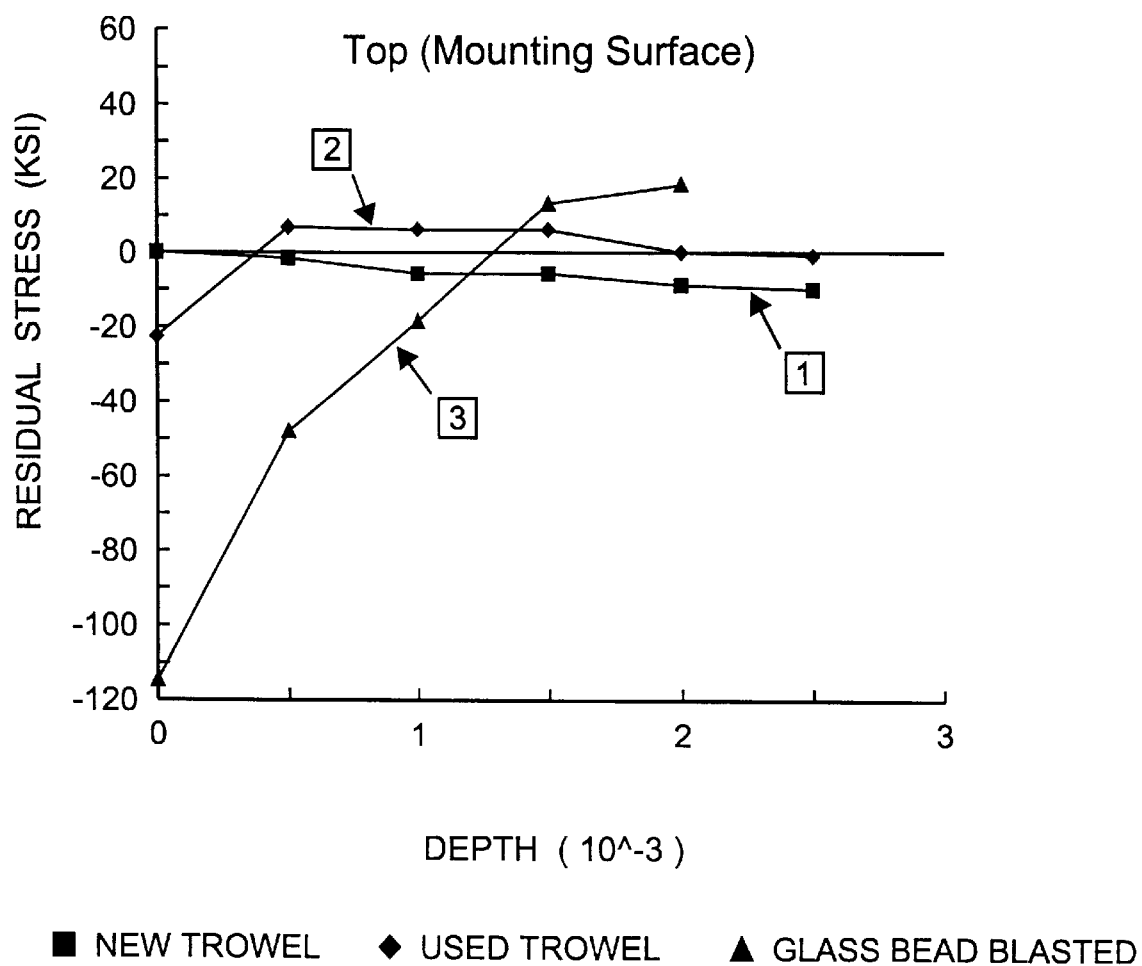
FIG. 8 is a graph showing transverse stress profiles on the top (mounting) blade surface for new, used, and glass bead blasted trowels, with tensile stress shown as positive (+) and compressive stress shown as negative (−). The vertical axis shows residual stress measured in KSI (kips per square inch) and the horizontal axis shows depth in thousandths (0.001) of an inch.
Figure 9:
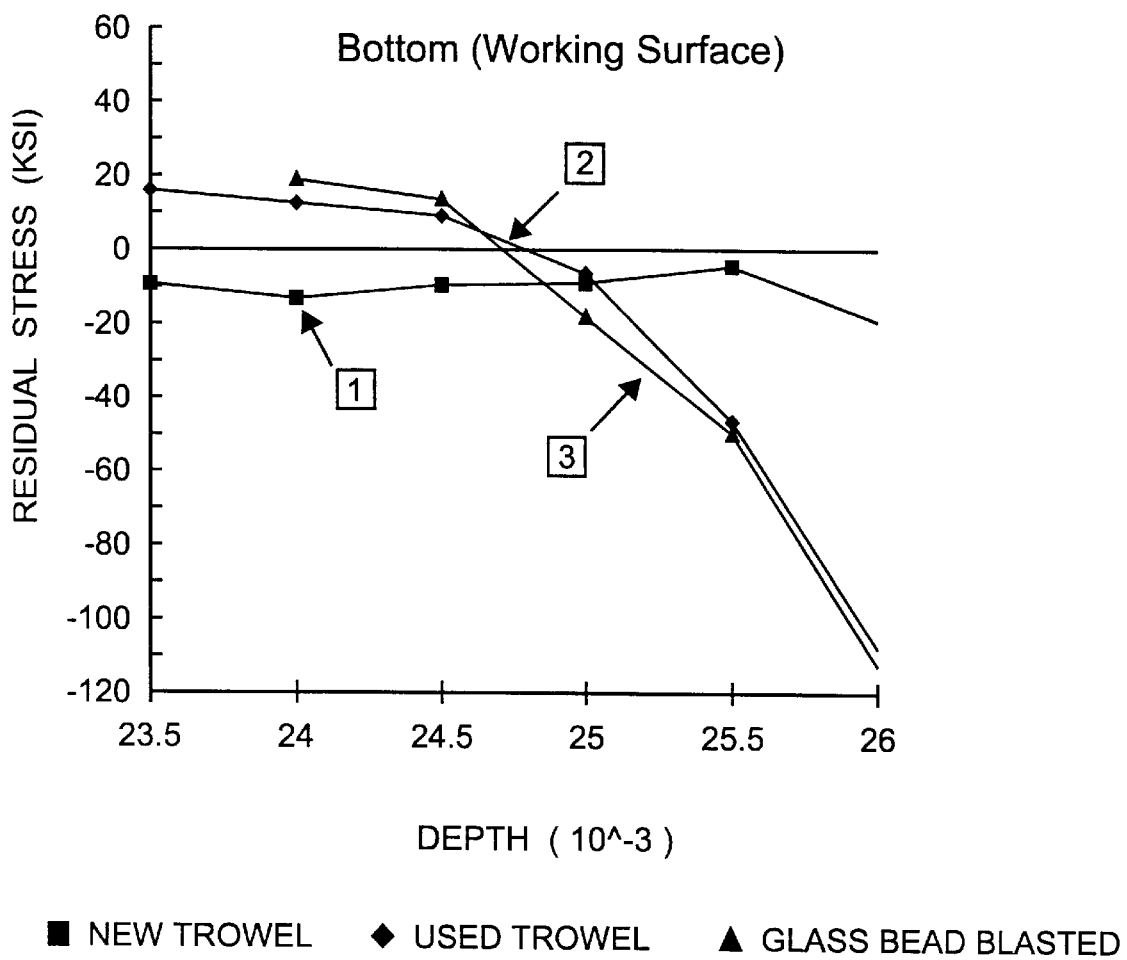
FIG. 9 is a graph showing transverse stress profiles on the bottom (working) blade surface 17 in FIG. 1 for new, used, and glass bead blasted trowels, with tensile stress shown as positive (+) and compressive stress shown as negative (−). The vertical axis shows residual stress measured in KSI (kips per square inch) and the horizontal axis shows depth in thousandths (0.001) of an inch.

Moreover, once this working stress level is reached, it remains substantially the same or constant with further use of the trowel. As shown in FIGS. 7 and 9, the axial and transverse stresses on the bottom working surface 17 (FIG. 1) for the glass bead blasted trowel (graphical plot 3) and the used trowel (graphical plot 2) mimic each other over the plotted range of depths. As FIG. 7 illustrates, axial stress plots 2 and 3 remain within 15–20 KSI or less of each other across the measured depth range of 23.5–26 thousandths of an inch. As FIG. 9 illustrates, transverse stress plots 2 and 3 remain within 10 KSI or less of each other across the same depth range. Hence, glass bead blasting (graphical plots 3) can produce residual stress profiles, particularly on the bottom working surfaces, that nearly match the natural limit of troweling induced stresses (graphical plots 2) caused by using the trowel.

Referring again to FIGS. 6–9, experiments have shown that stresses induced by use develop largely on the working surface of the blade with nothing to cause stress development on the top surface except reaction to developing working surface stresses. This is shown in graphical plots 2. Such asymmetrical build-up of stresses causes the trowel to change to shape. Substantial shape changes are likely to occur in the unstiffened transverse direction 16 (perpendicular to mounting 14) of a trowel blade 13 (See FIG. 2). Shape changes can and do also occur in the axial direction 12.

One set of glass bead blasting parameters that produces desirable stress inducing results is as follows:

Air Pressure: 40 psi
Angle of Impingement: 90 degrees
Striking Distance: 7 inches
Nozzle Traverse Velocity: 0.5 inches per second
Bead Size: 70–100 screen
Nozzle Size: 5/16 inch This embodiment produces a blast-contact area on the surface of the trowel blade of approximately 1.5 inches, which necessitates several passes to cover the entire surface of the blade. These parameters can be adjusted accordingly to produce wider (or narrower) blast-contact areas which produce substantially similar stress levels per unit area of blade material treated.

Alternatively, instead of using glass beads to impart stress in the surface of blade cell 31, steel shot may be used to treat surfaces 37, 43 and impart stress. The steel shot are propelled against surfaces 37, 43 by, for example, air pressure.

In another embodiment, the top and bottom surfaces 37, 43 may be ground with an abrasive grinder, as for example, a rotating vitrified grinding wheel or a coated abrasive belt to impart controlled stress.

In another embodiment, the top and bottom surfaces 37, 43 may be brushed with wire brushes to impart stress. Such brushing may be by rotary or reciprocal movement.

In another embodiment, the top and bottom surfaces 37, 43 may be brushed with wire brushes whose brush tips terminate in globules of adhesive or metal to impart stress. This technique will impart relatively more stress than conventional wire brushes. Such brushing may be by rotary or reciprocal movement.

In another embodiment, the top and bottom surfaces 37, 43 may be lapped against an abrasive material to impart stress. Such lapping should be uniform.

In another embodiment, the top and bottom surfaces 37, 43 may be polished to impart stress. Such polishing should be uniform.

In another embodiment, the top and bottom surfaces 37, 43 may be rolled by rollers for a predetermined length of time in order to impart stress. A roller (not shown) of a width longer than the width of surfaces 37, 43 is used. The roller is positioned at one end or edge of surface 37 (or 43) and rolled along the elongated and/or narrow direction of the surface 37 (or 43). The roller is forced against the surface at a predetermined force during rolling.

In another embodiment, the top and bottom surfaces 37, 43 may be vibratory finished to impart stress.

In all embodiments, the controlled stress intentionally imposed on surface 37 can be varied to be substantially equal to the stress which is created when smoothing a particular spreadable material. For example, if concrete is to be smoothed by the trowel, then the stress imposed on surface 37 and the immediate subsurface layers should be substantially equal to the stress profile which will be created there when the trowel smooths concrete.

The complimentary stress imposed on the back surface 43 of the blade causes the blade to assume a predetermined shape. For example, if it is desired to have a straight, near-flat blade, then the complimentary stress level on top surface 43 should substantially equal the level of stress on bottom surface 37.

If, on the other hand, it is desired that the blade have a slight bow, i.e., a convex shape in the narrow blade width direction on bottom surface 37, then the complimentary stress on the top surface 43 should be lesser than the stress level on the bottom surface 37. By varying residual stresses on the top mounting surface of a trowel blade, the blade shape can be intentionally manipulated so that it is anywhere from very convex to flat on the working surface. In a particular case, the working surface blade shape may even be formed concave. By masking selected areas during bead blasting of the top mounting surface of a trowel blade, special effects, including raised blade corners, can be achieved.

As discussed above, imposing residual stresses on the surfaces of a trowel blade allows the trowel to be manufactured in such a way as to maintain a desired shape. A trowel with appropriate imposed blade stresses will substantially maintain its shape throughout the life of the trowel. Without imposing blade stresses according to the present invention, the shape of a trowel blade will change over the life of the trowel because residual stresses build on the working surface but not on top. If the "correct" or "broken-in" blade shape is imposed on the trowel during manufacturing without imposing proper blade stresses according to the present invention, the working surface of the trowel becomes increasingly convex during use and may become unusable.

Recognizing the problems inherent in developing a trowel that will attain, and to a certain degree maintain, desirable shape over the life of the trowel, manufacturers fabricate trowels that attempt to compensate for the inevitable deformation of a trowel's working surface. Manufacturers have produced trowels with a working surface that is initially concave in the axial direction. The deliberate introduction of an undesirable initial blade geometry, however, exacerbates the "breaking-in" problems inherent in new trowels. With an initially concave axial working surface, the edges of the trowel will tend to dig into the concrete being worked. This will cause lines, popped aggregate and extensive dig marks to mar the finish on the concrete.

Figure 10:
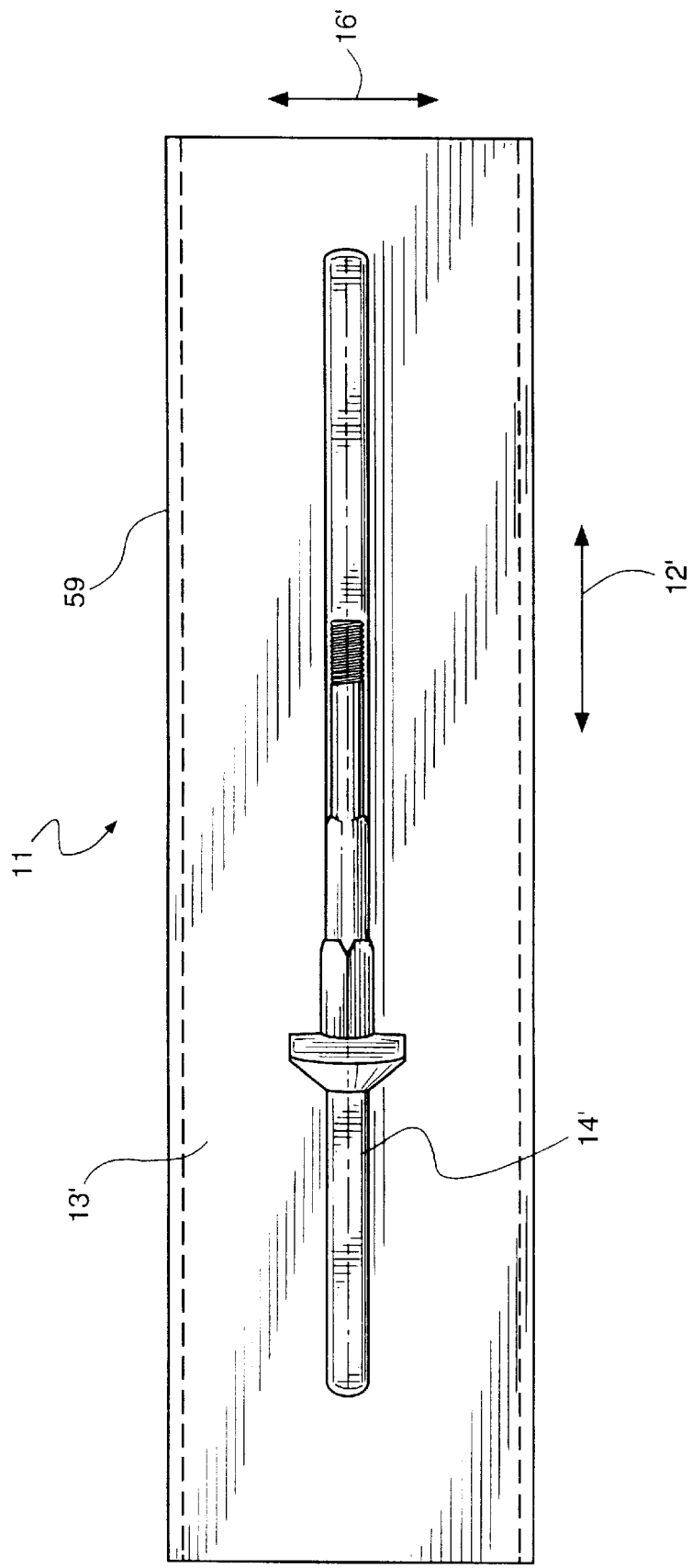
FIG. 10 is a top view of a broken-in trowel, less handle, according to the present invention.
Figure 11:
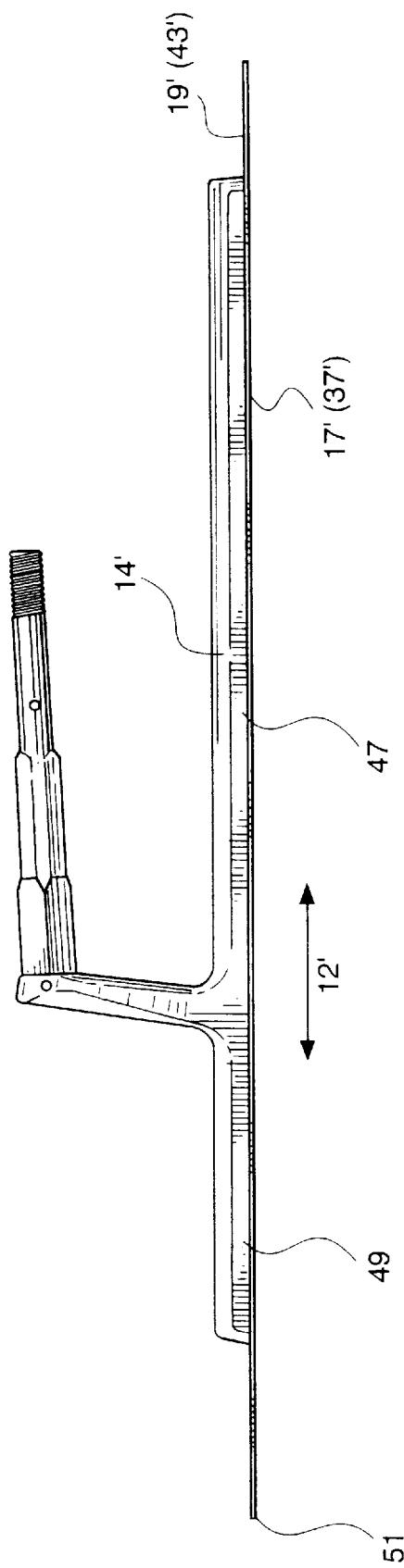
FIG. 11 is a side view of the trowel of FIG. 10.

The imposition of blade stresses allows the manufacturer to provide a trowel with a broken-in, convex shape that will substantially retain those characteristics over time. Referring to FIGS. 10 and 11, the experienced trowel user desires, and the geometrical constraints of any flat-finishing situation demand, a trowel with a bottom, or working, surface 17' (referred to in FIG. 1 as surface 17) that is convex. In other words, the flat blade 13 of FIG. 1 should be curved slightly upward between the center of the blade 13' and the four corners of the blade 13' if neither the corners nor ends of the trowel are to drag and leave lines or marks on the finish. Referring to FIGS. 10 and 11, the blade 13' is attached to the mounting 14', preferably by rivets. The convex axial shape of the working surface 17' may be imparted by any appropriate mechanical means of inducing localized yielding on the top surface of the mounting rib 14', for example, by striking the mounting rib 14 with a hammer. In the preferred embodiment of the broken-in trowel, the blade 13' is bowed in the axial direction 12' about a center point 47. Center point 47 defines the lowest point in the axial bow of the blade 13'. Measuring displacement from the plane defined by original axial directions 16' and 12', displacement of the blade is measured at points 49 and 51, with the bow between points 47 and 49 being less severe than the bow between points 49 and 51. It will be appreciated that the blade 13' is bowed substantially uniformly in both axial directions 12' about point 47. In the preferred embodiment, point 49 is vertically displaced approximately 0.006" from point 47. The outermost point 51 is vertically displaced approximately 0.019" from point 49. The imposition of blade stresses (27 and 29) as discussed above allows the trowel 11' to substantially maintain these desirable dimensions over the working life of the trowel 11'.

Figure 12:
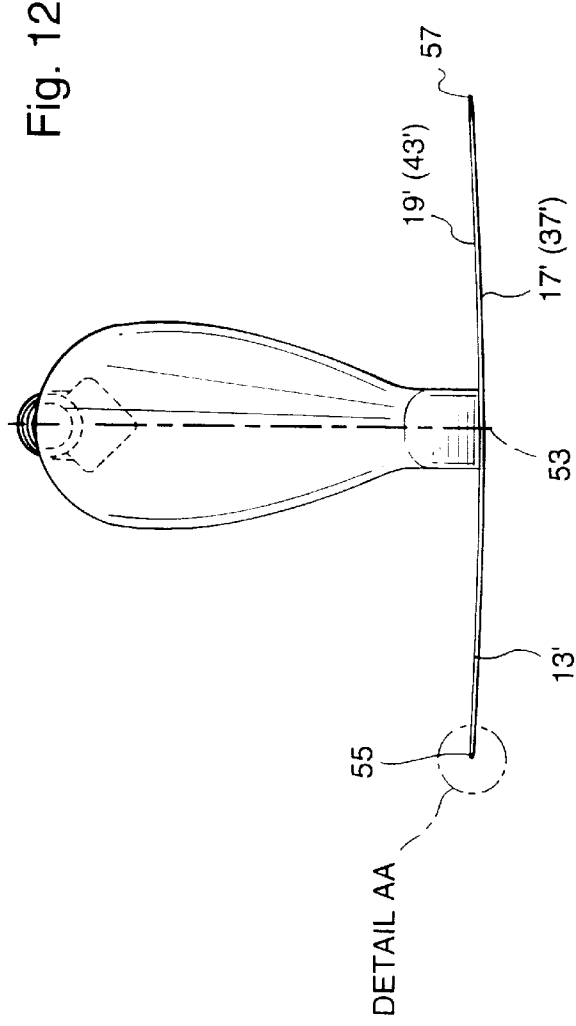
FIG. 12 is a front view of the trowel of FIG. 10.

FIG. 12 is a front elevation view of the trowel depicted in FIG. 10. Similar to the bowing in the axial direction 12' discussed above, the blade 13' is bowed in the transverse direction 16'. The blade 13' is bowed in the transverse direction about center point 53. Each end point (55 and 57) in the transverse direction 16 is vertically displaced approximately 0.025" from the center point 53. The transverse bow may be imposed by any appropriate means of inducing appropriate localized yielding in top surface 19', for example, by rolling, which is a well known process in the art of sheet metal fabrication. Although only a front view of the trowel 11' is depicted, it will be appreciated that the blade is bowed consistent in the 16' direction throughout the overall length of the trowel. As discussed previously, the blade 13' may also be bowed by varying the levels of compensating stress 29 and stress 27 (see FIG. 1) placed on the upper surface 19' and the working surface 17', respectively. Placing a lower compensating stress 29 on surface 19' than the stress placed on working surface 17' will give working surface 17' a convex shape both in the transverse direction 16' and the axial direction 12'.

Figure 13:
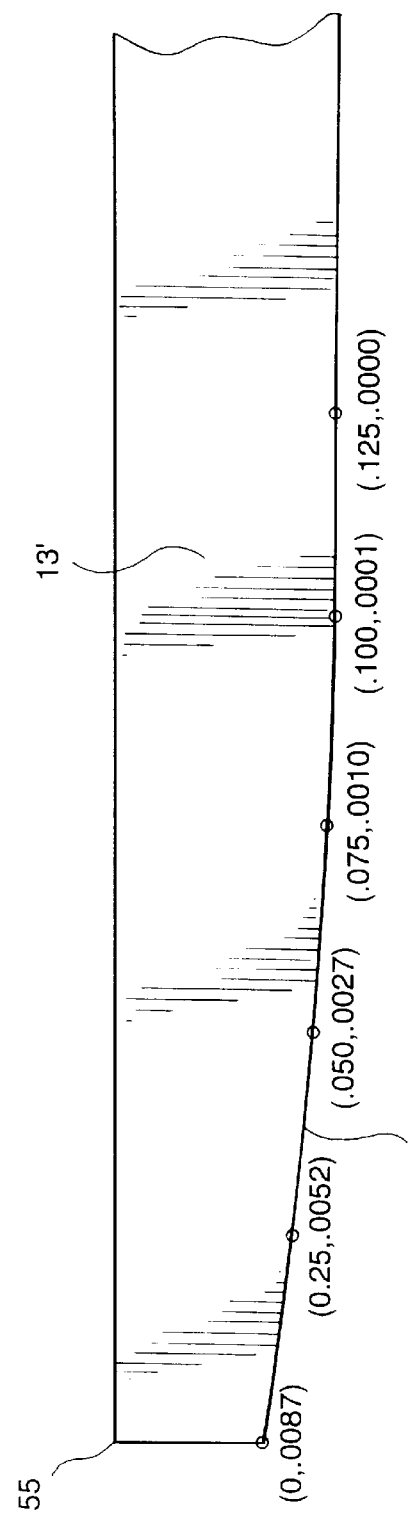
FIG. 13 is an enlarged view of the circled portion of FIG. 12 labeled "Detail AA".

FIG. 12 also has a portion encircled and labeled Detail AA. FIG. 13 is a blown-up view of the portion labeled Detail AA in FIG. 12. Another characteristic of a broken-in trowel is the tendency of the edges of the working surface 17' to become worn in the axial direction 12'. These worn edges provide favorable use characteristics to the experienced user in that they will not "pop rocks," to use the vernacular of the trade. This refers to the fact that the 90° corners of new trowel blade edges dislodge sand particles and small stones because the troweling pressure on them ends abruptly and not gradually as with the worn edge. The particles then jump from the surface being troweled in the same way and for the same reasons that small disks can be snapped from a flat surface into a cup in the game called tiddlywinks. The dislocated particles ("popped rocks") are unsightly on the work surface and can induce trowel edge flutter which further mars the finish of the work. Accordingly, the edges of the present trowel 11' have a bevel 59 that provides a gradually diminished dimension at the edge of the working surface 17' in the axial direction 12'. The bevel 59 may be provided by grinding the edges of blade 13' to desirable dimensions. The manufacturing dimensions for the bevel 59 of the most preferred embodiment are listed on FIG. 13. It will be appreciated that grinding to create the bevel 59 requires that the bevel 59 must have appropriate stresses imposed on the surface by, for example, blasting the bevel 59 with glass beads. This is necessary when the grinding removes a portion of the working surface 17' that already had appropriate blade stresses imposed.

There is, within the market for trowels, a market for the non-professional, or homeowner, trowel user. It will be appreciated that the problems inherent in a new trowel (popped rocks, etc.) are even more pronounced when the user is not a professional trowel user. It will also be appreciated that the non-professional trowel user uses a trowel infrequently, and is less concerned with how a trowel's shape behaves over periods of extended use. Accordingly, a trowel may be manufactured having a blade 13' with a working surface 17' that has the desirable convex geometry and beveled edges 59 depicted in FIGS. 10, 11, 12 and 13, without imposing appropriate blade stresses to maintain the broken-in-shape. This trowel will provide a user with a less expensive trowel that has broken-in characteristics, where the user is less concerned about eventual blade deformation because the trowel is used less frequently.

While only one preferred embodiment, and several alternative embodiments, of the invention have been described hereinabove, those of ordinary skill in the art will recognize that the embodiments may be modified and altered without departing from the central spirit and scope of the invention. Thus, the embodiments described hereinabove are to be considered in all respects as illustrative and not restrictive, the scope of the invention being indicated by the appended claims, rather than by the foregoing descriptions, and all changes which come within the meaning and range of equivalency of the claims are intended to be embraced herein.

What is claimed is:

1. A trowel containing a blade having intentionally imposed compressive residual stresses at both a top surface and a bottom surface sufficient to maintain the shape of the blade during future use of the trowel, said trowel comprising:

a mounting;

said blade connected to said mounting, said bottom surface of said blade having a cross sectional axial shape and a cross sectional transverse shape; and said cross sectional transverse shape of said bottom surface of said blade being convex.

2. The new trowel of claim 1 wherein said cross sectional axial shape of said bottom surface of said blade is convex.

3. The new trowel of claim 1 wherein said transverse shape and said axial shape are formed by said compressive residual stresses on said top surface and said bottom surface.

4. The trowel of claim 1, wherein longitudinal edges of said blade are beveled.

5. The trowel of claim 1, wherein said mounting is bowed.

6. The trowel of claim 1, wherein the edges of said blade are straight.

7. A trowel comprising:

a blade having a working surface and a top surface, said blade having a longitudinal axis and a transverse axis, said blade being bowed relative to said longitudinal axis providing a convex shape to said working surface, said blade having intentionally imposed compressive residual stresses at said working surface and said top surface of a magnitude sufficient to maintain the blade shape when the working surface is used to work a spreadable material.

8. A trowel according to claim 7 wherein said working surface of said blade is convex relative to said transverse axis.

9. A trowel according to claim 7 wherein said blade has longitudinal edges that are beveled.

* * * * *